United States Patent Office 3,409,731
Patented Nov. 5, 1968

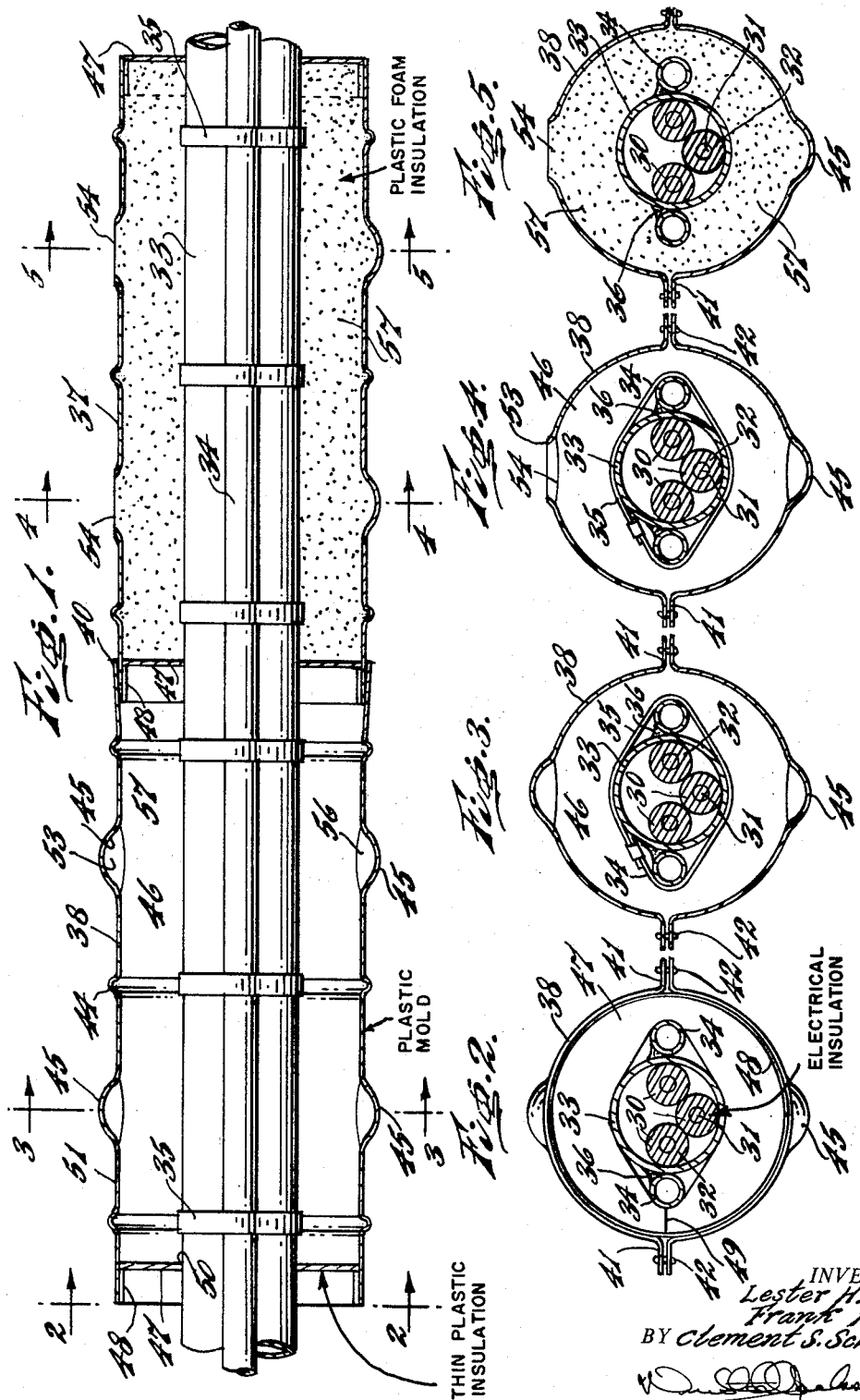

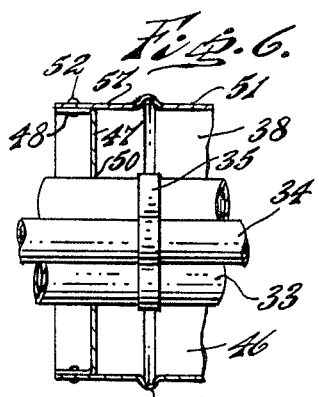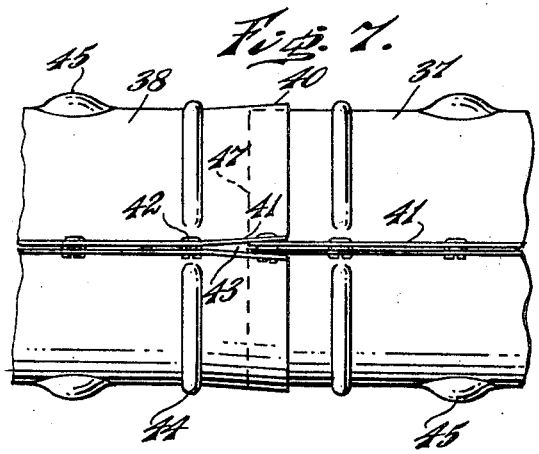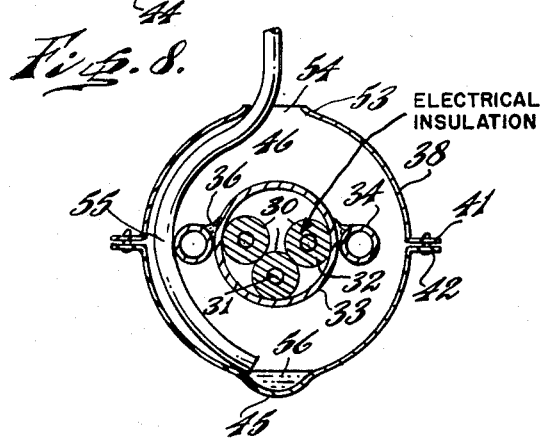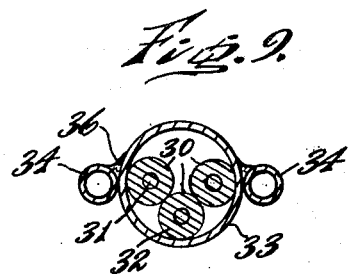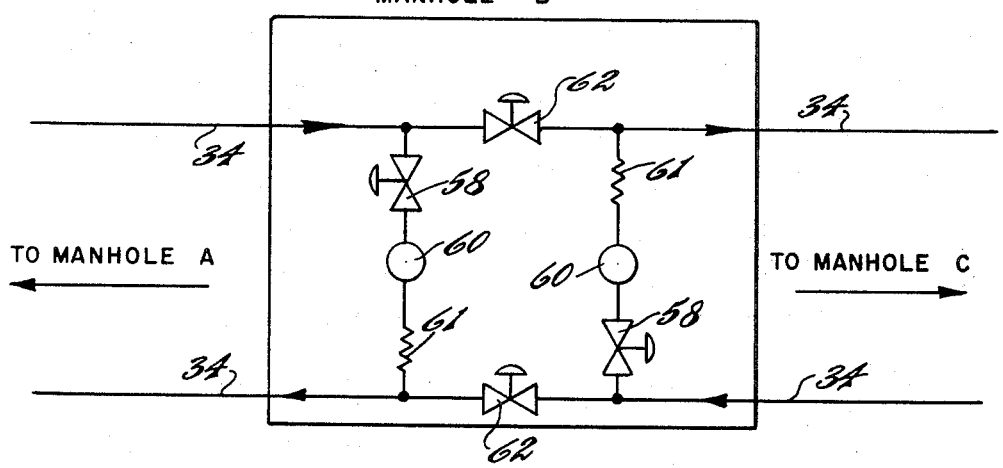

3,409,731
FORCE-COOLED CABLE SYSTEM
Lester H. Fink, R.F.D. 1, Doylestown, Pa. 18901, and Frank Kahn, 1865 Edmund Road, Abington, Pa. 19001, and Clement S. Schifreen, Philadelphia, Pa.; Rita F. Schifreen, executrix, of Clement S. Schifreen, deceased, assignor to Rita F. Schifreen
Filed Mar. 18, 1966, Ser. No. 535,569
23 Claims. (Cl. 174—15)

ABSTRACT OF THE DISCLOSURE

A pipe-type electric cable for earth burial is provided having two metallic coolant pipes secured laterally opposite and tangentially to the outside of the cable pipe and making thermally conductive contact therewith. The coolant flows in opposite directions in the coolant pipes which are cross-connected and refrigerated in the manholes at the ends of cable sections. A tubular envelope of thin pliable plastic material, providing a concentric mold space of substantial thickness is applied with appropriate spacers in telescoping short sections about the cable pipes. Rigid unicellular polyurethane insulation providing both thermal insulation and corrosion protection is foamed into each of the envelope sections through suitable fill openings. In another form of the pipe cable, heat removed from the coolant pipes at the manholes is rejected to earth coolant circulated through another set of coolant pipes buried in the earth external to and along the insulated cable pipe.

Description of the invention

The present invention relates to an insulated electric cable construction suitable for burial in the earth.

A purpose of the invention is to secure, on the outside of the metallic cable pipe of an electric cable, metallic coolant pipe means of relatively smaller diameter than the cable pipe, to surround the cable pipe and the coolant pipe means with heat insulation, suitably of a moisture-impervious plastic foam, which also provides corrosion protection for the cable pipe, and to circulate coolant through the coolant pipe means, preferably through opposed coolant pipes on opposite sides of the cable pipe.

A further purpose is to tsecure the coolant pipes to the cable pipe and obtain superior heat transfer by providing a metallic bond or contact between the coolant pipes and the cable pipe, for example by sweating, soldering, brazing or welding, or by pouring into the groove between the coolant and cable pipes hot molten metal which is solid at operating temperatures.

A further purpose is to introduce a rigid unicellular foam insulation around the assembly of cable pipes and coolant pipes by telescoping one end of a tubular envelope with respect to the tubular envelope of a section already installed about the assembly, thus providing space between the outside of the cable pipe assembly and the tubular envelope of the new section, to close the opposite end of the new tubular envelope by closures, to provide an opening into the space inside the new tubular envelope and to introduce plastic foam into this space.

A further purpose is to make the tubular envelope of segments which are flanged at the lateral edges and to join the segments by a suitable fastening.

A further purpose is to provide an end closure consisting of disk shape portions flanged at the outside and capable of being secured to the tubular envelope.

A further purpose is to provide at the ends of the sections of the cable coolant means connected to the coolant pipes for circulating coolant through the cooling pipes; and the opposite ends of the coolant pipes being cross connected preferably through another coolant means operating at that location.

A further purpose is to dissipate heat from the coolant means by heat transfer to a heat dissipating means and to convey the heat through heat dissipating pipes buried in the earth outside the heat insulation but adjoining the cable.

A further purpose is to provide for series connection of coolant pipes and also of heat dissipating pipes between adjoining sections in case of emergency.

A further purpose is to energize the coolant means and the heat dissipating means at the ends of alternate cable sections by different electric circuits so that in case of failure of one circuit the cable could still operate under the energization of the other circuit.

A further purpose is to reduce the cost of thermal insulation and cooling of electric power cables.

Further purposes appear in the specifications and in the claims.

In the drawings we have chosen to illustrate a few only of the numerous embodiments in which the invention may appear, selecting the form shown from the standpoints of convenience in illustration, satisfactory operation and clear demonstration of the principles involved.

FIGURE 1 is a fragmentary longitudinal section of a cable of the invention showing the cable pipe and coolant pipes and broken away to show the interior construction by which the envelopes are held in position and can be filled with foam insulation.

FIGURE 2 is a section of FIGURE 1 on the line 2—2.

FIGURE 3 is a section of FIGURE 1 on the line 3—3.

FIGURE 4 is a section of FIGURE 1 on the line 4—4, omitting the foam.

FIGURE 5 is a section of FIGURE 1 on the line 5—5.

FIGURE 6 is a fragmentary longitudinal section showing the attachment of the enclosure to the envelope.

FIGURE 7 is a fragmentary side elevation showing the arrangement for telescoping the ends of the envelopes.

FIGURE 8 is a fragmentary transverse section showing the introduction of the liquid reactants into the space inside the envelope.

FIGURE 9 is a fragmentary transverse section of the cable pipe and the coolant pipes showing the metallic filler in the grooves between the cable pipes and the coolant pipes.

FIGURE 10 is a layout diagram for a cooling system at a given manhole.

Figure 11:
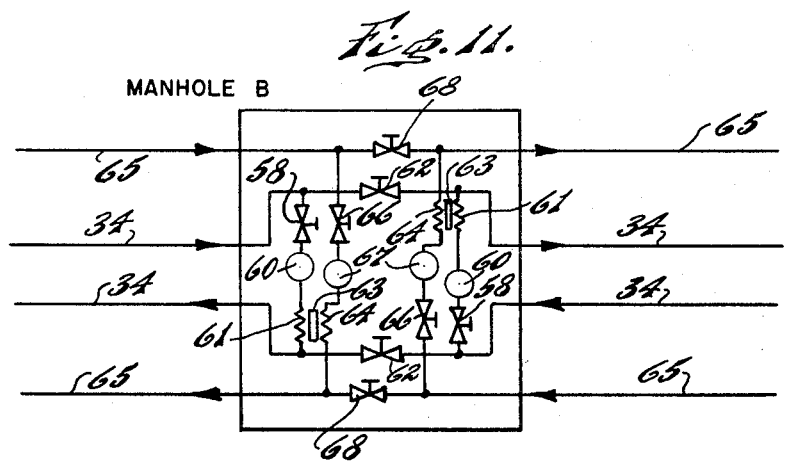
FIGURE 11 is a layout diagram for a cooling and heat dissipating system at the same manhole.

The allowable current carrying capacity of a buried cable system is limited by the conductor temperature which is established by the restriction of the escape of heat caused by unavoidable thermal energy losses. It is possible to obtain significant increases in current carrying capacity if the thermal losses are removed by a cooling medium instead of merely being dissipated by ordinary unassisted heat flow into the surrounding earth. If the cooling is to be achieved efficiently, good thermal interchange must be provided between the cable system and the cooling medium, and the thermal insulation must be interposed between the surrounding earth and the cable system including the cooling means. The thermal insulation prevents the coolant from unnecessarily extracting heat from the earth. The presently available means to achieve these objectives are very inefficient, expensive and difficult to install on long cable pipes in the field.

We have invented a simplified circulating cooling system combined with an inexpensive thermal insulation means which can be applied easily in the field to cable pipes of substantial length. One of the great virtues of the invention is that it provides corrosion protection for the cable pipe and the coolant pipes.

In the preferred embodiment the cable pipe is paralleled by two coolant pipes of smaller diameter, the coolant pipes preferably being located on opposite sides of and in contact with the cable pipe in horizontal transverse alignment.

In the preferred form the cable pipe and the coolant pipes are lashed together with binding straps and the assembly of them is supported in the trench for example by sand bags at suitable intervals about six feet. An expendable segmented mold is applied around the pipe assembly, one pair of segments at a time. Each segment is preferably semi-cylindrical and fits around the pipe assembly registering the diametral edge flanges or fins. The envelopes are provided with blisters, the uppermost ones of which can be cut off to provide openings into which a foaming plastic, for example a polyol isocyanate resin system, can be introduced. Suitable enclosures and spacers can assure concentricity and the foam quickly achieves strength and rigidity so that the cable combination can be backfilled.

When installing the mold sections about the pipe assembly, the trailing ends can be overlapped on the preceding envelope or mold section and the leading end can be supported by suitable enclosures. In a matter of seconds after the liquid resin has been introduced, it expands violently to fill the space inside the envelope with polyurethane foam. The blowing agent and excess foam escape through the fill opening and through any small gaps between the mold sections. Within a very few minutes the construction is ready for backfilling so that the sandbag support can be removed and the cable and its insulation can be surrounded with earth.

Considering now the drawings in detail, the cable construction comprises cables 30 suitably having conductors 31 and insulation 32 which are enclosed in a cable pipe 33 suitably connected to form a continuous metallic covering. From the standpoint of the present invention, the cable itself may consist of any suitable number of conductors, in the drawing being shown typically as three, and the space around the cable and inside the cable pipe may be a vacuum, or filled with oil, or a suitable gas such as nitrogen, or argon under an appropriate pressure.

The cable pipe 33 itself will conveniently be of steel, aluminum, copper or any other suitable metal or alloy.

After a suitable length of cable and cable pipe have been assembled in or adjacent the ditch in the process of installation, coolant pipes 34 are brought into contact with the outside of the cable pipe and held there, conveniently by metallic straps 35.

It is important that at the heat transfer surfaces the cable pipe be reasonably clean and that the coolant pipes be clean so that no impediment to heat transfer will exist and for this purpose in many cases the cable pipe and if necessary the coolant pipes will be cleaned at the locations of contact prior to bringing them together. Suitable cleaning techniques include sandblasting, grit blasting, sandpapering, burnishing, chemical cleaning, and the like.

In some cases it may be desirable to coat the coolant pipe and the cable pipe or one of them to promote intermetallic bond. Thus, if both are of steel, the pipes may be galvanized on the outside. Flux may of course be used to promote bond.

In the preferred embodiment of the invention it is very desirable to obtain intermetallic contact which will improve the heat transfer between the cable pipe and the coolant pipes and for this purpose we show a contact metal or joining metal 36 applied by any suitable technique such as pouring a low melting point metal in the grooves between the pipes with or without metallic bonding or wiping with lead, sweating with solder, brazing or welding. Satisfactory heat transfer between the pipes may be obtained by merely pouring molten lead to fill the grooves and permitting it to solidify.

If the pipes are to be integrally joined in order to obtain improved heat transfer, the character of the joining metal will vary depending on the character of the metal used for the coolant pipes as compared with the character of the metal used for the cable pipe. If the coolant pipes are of steel and the cable pipe is of steel, any of the above techniques may be used, but if for example, the coolant pipes should be of aluminum and the cable pipe is of steel, then specialized alloy as known in the art should be employed for joining at 36. It is very desirable to provide two-way coolant flow through the coolant pipes and, therefore, it is indicated that two coolant pipes will be used although, of course, in special cases more than two might be employed, and in unusual applications a single coolant pipe might be employed in contact with one cable pipe, and the return might be of a coolant pipe in contact with another cable pipe.

The coolant pipes are preferably placed at the horizontal diametral position on opposite sides of the cable pipe, and this is especially advantageous where the coolant pipes are considerably smaller than the cable pipe as will be the usual case.

Any of a wide variety of coolants may pass through the coolant pipe, such as water, brine, a compressed gas such as ammonia, nitrogen, Freon, argon or helium, or even a liquified gas such as liquid nitrogen or liquid helium.

It is important to provide a heat insulating and corrosion protecting layer around a combination of the cable pipe and the coolant pipes. In the preferred technique, as shown in the drawings, a first section of envelope or expendable mold 37 is first placed in spaced relation to the cable and coolant pipes surrounding it, suitably closed at both ends by the enclosures to be described, and the space inside is filled with plastic foam in the manner to be described. This is used then as an anchorage for the next mold section at one end and this procedure is continued endlessly along the length of the cable.

Thus having established the one section 37, envelope or mold segments 38, preferably of a suitable relatively thin plastic such as polyvinyl chloride, linear polyamide, polyethylene, polystyrene, cellulose actate butyrate or acrylic plastic, in its transparent, or partially transparent form, are caused to surround in telescoping relation the end of the section 37 at 40. Each of the segments 38 has flanges or fins 41 at its cooperating circumferential ends and once the telescoping relation is achieved, the flanges or fins 41 are joined as by staples 42. As shown in FIGURE 7 there may be a slight gap 43 near the telescoping end but this is of minor significance as the foam will fill and close this gap.

The segments 38 desirably have circumferential strengthening ribs 44 and are provided with blisters 45 at the top and bottom, the blisters being conveniently medial between the ends and the middle.

A space 46 is thus provided between the outside of the cable pipe and the coolant pipes on the one hand and the inside of the envelope or mold on the other hand. The end of this space remote from the prior filled insulation section is closed by a transverse filler or spacer portion 47, illustrated in FIGURES 1 and 2, of disk shape, which may be made of the same material as the mold segments 38 and has a circumferential flange 48 and an opening 50 fitting the contour of the combination of the cable pipe and the coolant pipes. The spacer 47 is suitably flexible so that it may be split at 49 to permit of its being twisted open to be placed around the pipe assembly. The flange 48 may have one or more suitably disposed axial cuts, not shown, to facilitate twisting it open. The spacer 47 extends inside the end of the completed envelope or mold 51 with the flange 48 extending outwardly to the end thereof and it is held in place as by staples 52.

In order to fill the plastic foam into the space 46, the top blisters are cut off at 53 to provide fill openings 54 and an expendable filling tube 55 for example of paper, plastic or other inexpensive material, is introduced in each fill opening to a point adjoining the respective bottom blisters 45 (FIGURE 8).

To assure moisture-proof bonding of the foam to the spacer 47, its surface may be suitably roughened for this purpose by mechanical abrasion, by pretreatment with chemical solvents, or by application of an appropriate adhesive. For example, for polyvinyl chloride spacers, an effective bond with rigid unicellular polyurethane foam may be obtained by sanding the surface, by treatment with toluene or by applying a thin coating of a general adhesive containing methyl ethyl ketone marketed by W. J. Ruscoe Company of Akron, Ohio, under the name Pliobond.

A suitable conventional liquid two-part foamed-in-place polyol isocyanate resin system which foams spontaneously to produce an electrically insulating and heat insulating corrosion protective rigid unicellular plastic foam is poured into the space 46. It is understood that the term unicellular refers to the fact that the cells are non-intercommunicating and the foam is therefore non-porous.

The isocyanate foam has the advantage that it tenaciously adheres to bare metal and is resistant to water and chemicals, and thus protects against corrosion of the cable pipe and the coolant pipes. It also gives good electrical insulation which in itself aids protection against corrosion.

The resin system comprises two liquids, a resin primer phase and a so-called prepolymer phase which when mixed together in a very short time begin to produce foam. The resin premix phase may comprise a polyether mixed with a blowing agent, for example a fluorocarbon such as trichloromonofluoromethane. The prepolymer phase may comprise a suitable di-isocyanate which has been partially reacted with a polyol but which still contains unreacted di-isocyanate, and may also contain the blowing agent. The composition may be suitably designed to begin foaming action in from about 15 seconds to one and one-half minutes after mixing the two phases.

Suitable amounts of the two phases are thoroughly mixed and then immediately poured through the fill opening 54 into the fill space 46. The liquid mixture drains downwardly into and accumulates in the associated bottom blister 45 constituting the well 56 which has a capacity usually adequate to contain more than enough reactant material to fill at least half of the mold with foam after it has once reacted. The filling tube 55 preferably will be withdrawn as soon as the reactant material has been deposited in the well 56. Almost immediately after the liquid reactant material reaches the well 56 it begins to foam very rapidly, and under pressure of the blowing agent violently froths up and fills the mold with foam 57 which expands outwardly and through all openings.

Small openings such as those among the seams of the mold at the flanges 41 and between the staples become plugged with foam almost instantly after escape of the blowing agent through them. The general distribution and large number of these small openings provide assurance against the gaseous blowing agent being pocketed in the mold and preventing complete filling of the mold with foam. Openings or chinks of excessive size can be sealed with tape if desired. The excess foam froths up through fill openings in the top and the excess can be cut or sawed off and discarded.

A large opening such as the fill opening in the top is essentially for providing pressure relief of the internal pressure provided by release of the blowing agent in excess of that required to fill the mold with the foam. The optimum size of this large opening depends on the size of the mold, but it should not be less than two inches in diameter in any case. After the small openings are sealed off, the large opening acts as a relief valve to prevent tearing out of the staples or other disruption of the mold by excess pressure.

The ribs 44 provide the requisite stiffness and rigidity to prevent the mold from distortion during the foaming action and also contribute to the compressive strength of the mold and the foam assembly about the pipe to resist the soil pressure when the cable is buried in the earth.

Should the foam fail to fill the mold space 46, the voids left therein are readily apparent through the transparent or semi-transparent material of the mold, hence when viewed from the outside there is a pronounced difference in appearance of the foam when it is in contact with the inner surface of the mold and when it is spaced therefrom. The voids resulting from failure of the foam to completely fill the mold practically always occur at or near the top of the mold where they are easily observed. An incision may readily be made in the relatively thin wall of the mold with a knife or other sharp tool at the location of a void and a small quantity of liquid foaming material can be inserted at this point to fill up the void.

The cable is, for the purpose of cooling, subdivided into cooling sections, each of which ends at what for convenience will be designated as a manhole. It will be understood, of course, that this designation is appropriate whether or not the manhole is located underground or constitutes a building above ground, or whether it constitutes an independent structure such as a coffer dam if the cable is carried under water or through swamp.

In FIGURE 10 manhole B is illustrated receiving coolant pipe 34 from two cable cooling sections, one between manhole A and manhole B and the other between manhole B and manhole C.

The coolant flowing through one pipe 34 toward manhole B passes through normally open valve 58 from which it is forced by pump 60 through cooling heat exchanger 61 of a suitable refrigeration or cooling system, other parts of which are not shown, although it will be understood that it will include the usual features depending on the type of system.

Thus heat is extracted from the coolant at both ends of each cable cooling section in the preferred form.

Coolant pipes are cross-connected in series by normally closed valve 62. If for any reason there is an equipment failure in manhole B as for example by failure of power supply or failure of the refrigeration system or the pump, by opening valves 62 and closing valves 58 the coolant pipes on each side of the cable can be connected in series and the cable can be cooled at reduced capacity from manhole A and manhole C cutting out manhole B to the extent necessary.

Of course, this will require disposal of a large amount of heat at each manhole. This can be done by water cooling, by blowing air over the equipment in the manhole, or other suitable means.

In order to do this in the preferred embodiment a separate heat dissipating system is used. The portion of the refrigeration system which evolves heat, here designated as heat exchanger 63, is in heat transfer relation with a heat dissipating heat exchanger 64. A separate heat dissipating coolant flows through the heat exchanger 64 between heat dissipating pipes 65 buried in the soil suitably on either side of the cable combination outside of the heat insulation. The heat dissipating pipes will desirably be of some corrosion resistant material such as stainless steel, copper, or copper base alloy. The heat dissipating coolant may be of any of the characters described for the coolants used in the pipes 34 and when water or brine is used, they may if desired, be operated under high pressure so that high initial temperatures may be employed without exceeding the boiling point. The heat dissipating coolant from one pipe 65 enters manhole B and passes through normally open valve 66 under the action of pump 67 and through heat exchanger 64 to flow away from the manhole through the other heat dissipating pipe 65, at the adjoining manholes A and C there being cross connections for completing of the circulation through similar systems as shown.

At manhole B and every other manhole heat dissipating pipes 65 on the same side are separated by normally closed valves 68, but in case of emergency as through equipment failure at manhole B, valve 68 can be opened and the valves 66 closed to place the heat dissipating pipes 65 on one side of the system in series and operate at reduced capacity from manholes A and C.

Figure 13:
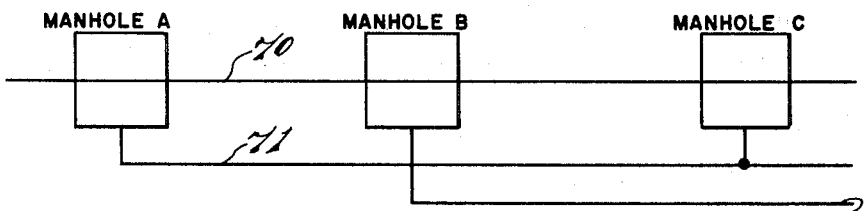
FIGURE 13 is a layout diagram for connection of power sources to the coolant and heat dissipating system in various manholes.

It may be desirable that the power supply in alternate manholes be from different sources. Thus in FIGURE 13 are shown manholes A, B and C through which the cable system 70 passes. Every alternate manhole is connected to power supply source 71 and intervening manholes are connected to power supply source 72.

$W$=the generated cable energy loss, in watts per lineal foot.
$H$=the thermal resistance between conductor and coolant of each lineal foot, in ft.°C./watt.
For the system described herein $$H = H_{cp} + \frac{H_{wp}}{2} + \frac{L}{4Cf} + \left(\frac{L}{4Cf}\right)^2 / H_{wp}$$

where $C$=specific heat of coolant; watt-minutes/cu. ft./°C.
$f$=coolant flow; cu. ft./min.
$H_{cp}$=thermal resistance between conductor and cable pipe; ft. °C./watt.
$H_{wp}$=thermal resistance between cable pipe and coolant; ft.°C./watt.
$L$=distance between cooling stations; feet.

As is well known to cable engineers, the losses in the cable system are not generated at the conductor surface but rather at various locations within the system, including the conductor, the cable shield, the containing pipe, and generally throughout the electrical insulation. The calculation of the effective thermal resistances $H_{cp}$ and $H_{wp}$ reflects this distribution of losses.

TABLE I.—COMPARISON OF POWER HANDLING CAPACITIES CONVENTIONAL vs. FORCED-COOLED PIPE CABLES

| Voltage | Conventional Pipe Cable | | Forced-Cooled Pipe Cable | | Improvement in Power Capacity, percent |
|---|---|---|---|---|---|
| | Conductor Size | Power Handling Capacity | Coolant Flow Rate | Power Handling Capacity | |
| 69 kv | 1,500 MCM | 95 mva | 18 gal./min | 172 mva | 81 |
| 138 kv | 2,000 MCM | 216 mva | 18 gal./min | 373 mva | 80 |
| 230 kv | 3,000 MCM | 351 mva | 18 gal./min | 645 mva | 84 |
| 230 kv | 3,000 MCM | 351 mva | 36 gal./min | 720 mva | 105 |

NOTE.—Based on continuous loading, conductor temperature 75° C., earth ambient 25° C. and soil thermal resistivity 80° C.-cm./watt. The cooled pipe system was calculated for cooling stations spaced 3,000 feet apart and the heat transfer through the envelope was considered to be negligible.

In operation it will be evident that as heat is evolved by the cable it is transferred to the coolant in the coolant pipes. The coolant transfers the heat to the coolant coil of the refrigeration system. The refrigeration system through its condenser or heat liberating unit, gives off heat which can be picked up by circulating air but will preferably be transferred through a heat exchanger to the coolant in the heat dissipating system. This coolant in the heat dissipating system becomes heated and passes through the heat dissipating pipes where the heat is dissipated through the soil surrounding the cable, outside the heat insulating layer around the cable.

Calculations indicate that by use of the forced cooling system of the present invention the power handling capacity of a conventional pipe type cable can be very substantially increased. For example, in a conventional 138- kv. 2000 MCM pipe cable having a thermal loss of 28.6 watts per foot at a rated capacity of 905 amperes (216 mva.) by using the forced cooling system of the invention with cooling stations 3000 feet part, cooling with water at a pressure of approximately 100 p.s.i. through 1¼ inch coolant pipes at 18 gallons per minute will remove 80 watts per foot corresponding to a thermal loss of 1630 amperes (373 mva.). If the counter current coolant were supplied at 0° C. the conductor temperature would be maintained below the allowable 75° C.

Table 1 shows power handling capacities for forced cooled cable systems of the invention as compared with otherwise identical conventional cable systems.

The relationship between the watts generated in the cable and the consequent temperature rise of the conductor above the coolant at its initial temperature is represented by an expression $\Delta T = WH$
where $\Delta T$=the maximum temperature rise of the conductor above initial temperature of the coolant, in °C.

Figure 12:
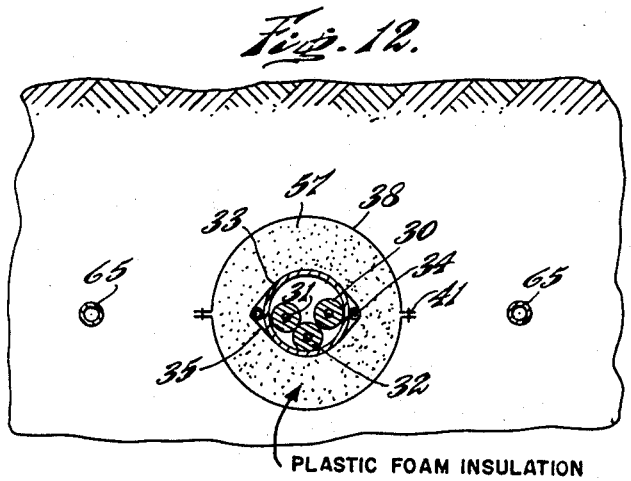
FIGURE 12 is a diagrammatic transverse section through the completed cable, the heat dissipating pipes and the earth showing the backfill.

The heat absorbed by the coolant, which may be at the rate of hundreds of kilowatts, is removed by heat exchange refrigerating means at respective spaced cooling stations and there rejected by any appropriate means. Cooling by water wasted to sewers, or rejection of the heat to atmosphere by using blowers, may effectively be used. However, we prefer to use the system illustrated in FIGURES 11 and 12, in which heat dissipating fluid circulates between adjacent cooling stations in a separate circulating system, comprising heat dissipating pipes extending between the cooling system parallel to and horizontally spaced on either side of the cable system envelope. Appropriate heat exchange equipment transfers the heat removed from the coolant to the fluid in the heat-dissipating pipe system wherein the fluid is circulated by suitable pumps. The pipes are of bare metal which is resistant to corrosion in the earth environment, such as copper or suitable stainless alloys. An example is given in Table II below of heat rejection to earth using this system under specific conditions of operation.

The heat rejected to the earth by the heat-dissipating fluid may be calculated by the expression $$W' = \left[\frac{\sqrt{H_s^2 - H_m^2} - (H_s = H_m)\sinh\beta - \cosh\beta}{\sqrt{H_s^2 - H_m^2} + H_m \sinh\beta}\right] C'f'\Delta T'$$

where the symbols $W'$, $C'$ and $f'$ have reference to the heat-dissipating fluid rather than to the coolant.

$H_s$=thermal resistance from the heat dissipating pipe to ambient; ft. °C./watt.
$H_m$=mutual thermal resistance between the two heat dissipating pipes; ft. °C./watt.
$\Delta T'$=initial temperature rise of heat dissipating fluid above earth ambient; °C.

$\beta = L/C'f' \sqrt{H_s^2 = H_m^2}$; dimensionless.

TABLE II.—HEAT REJECTION TO EARTH BY HEAT DISSIPATING FLUID SYSTEM

| Size of Pipe | Rate of Heat Rejection, kw. |
|---|---|
| 2 inch | 276 |
| 6 inch | 324 |

Note.—Fluid assumed to be water flowing at 18 gal./min. with temperature initially at 100° C. and earth ambient 25° C. Soil thermal resistivity 120° C. —cm./watt. Assumed spacing between pipes, 3½ feet.

It will be observed that substantial rates of heat rejection are possible by use of this system, even when a soil of poor thermal dissipating quality (120° C.–cm./watt) is used. This contrasts with the conventional cable pipe in which care must be used to have the soil surrounding the pipe of uniform low thermal resistivity to provide adequate heat dissipation and to avoid creation of hot spots in the cable. Since the cable rating is limited by the temperature of the hottest spot, this usually necessitates importation of thermal sand or equivalent backfill to insure freedom from areas of high soil thermal resistance. Our cable pipe system is indifferent to variations in soil thermal resistivity because occurrence of hot spots is of no material consequence in the heat dissipating pipe system.

It will be evident that the invention is capable of use under a wide variety of electrical conditions, both alternating current and direct current, commercial frequency and higher frequency, and that principles of the invention can be applied not only to utility power cables, but also to cable distribution in the nature of bus duct concerned with supply to machinery and equipment in particular plants.

In view of our invention and disclosure variations and modifications to meet individual whim or particular need will doubtless become evident to others skilled in the art, to obtain all or part of the benefits of our invention without copying the method and structure shown, and we therefore claim all such insofar as they fall within the reasonable spirit and scope of our claims.

Having thus described our invention what we claim as new and desire to secure by Letters Patent is:

1. In an insulated electric cable construction, an electric pipe-type cable including a metallic cable pipe to be buried in the earth, metallic coolant pipe means of relatively smaller diameter than the cable pipe in heat conductive contact with the outside of the cable pipe, means for circulating a coolant in said coolant pipe means, means for securing the coolant pipe means to the outside of the cable pipe in heat conductive contact therewith, and moisture-impervious heat insulation surrounding and in contact with the coolant pipe means and the cable pipe, providing both thermal insulation and corrosion protection from the earth environment.

2. An insulated electric cable construction of claim 1, in which said coolant pipe means includes a coolant pipe disposed in lateral tangency to and in metallic contact with said cable pipe and the means for securing the coolant pipe means to the outside of the cable pipe comprises a metallic fillet in the upward groove between said coolant pipe and the cable pipe.

3. An insulated electric cable construction of claim 1, in which the coolant pipe means comprises a plurality of coolant pipes in heat transfer contact with the surface of the cable pipe.

4. In an insulated electric cable construction, a pipe-type cable including a metallic cable pipe, a first section of tubular envelope surrounding the cable pipe in spaced relation, a unitary thin plastic end closure for the first section extending at one end of the first section from the cable pipe to the envelope, heat insulation in the space between the first section and the cable pipe, a second section of tubular envelope secured at said one end to the first section and surrounding the cable pipe in spaced relation and in prolongation of the first section a unitary thin plastic end closure for the second section closing the space between the second section and the cable pipe at the end remote from the first section, and moisture-impervious heat insulation foamed in place with a blowing agent in the space between the second section and the cable pipe, said tubular envelope being provided with a fill opening and a plurality of generally distributed small peripheral openings for escape of the blowing agent, and said insulation having a moisture-proof bond to said end closures.

5. A cable construction of claim 4, in which each of the sections of envelope comprises segments flanged at the circumferential ends, and spaced fasteners joining the flanged ends, the joined surfaces between the fasteners being separated to provide openings for escape of said blowing agent.

6. A cable construction of claim 4, in which the first and second section of envelope mutually telescope at adjoining ends.

7. A cable construction of claim 4, in which the heat insulation comprises polyurethane foam.

8. A cable construction of claim 4, in combination with metallic coolant pipe means in contact with the outside of the cable pipe and extending longitudinally thereof within the heat insulation, and means for securing the coolant pipe means to the outside of the cable pipe.

9. A cable construction of claim 8, in which said coolant pipe means includes a coolant pipe disposed in lateral tangency to and in metallic contact with said cable pipe, and the means for securing the coolant pipe means to the cable pipe includes a metallic fillet in the upward groove formed by the junction of said coolant pipe and the cable pipe.

10. A cable construction of claim 8, in which the coolant pipe means comprises first and second coolant pipes at diametrically opposed positions against the outside of the cable pipe.

11. A cable construction of claim 8, in which said end closures each comprise a disk having a central opening for receiving the assembly of cable pipe and coolant pipe means, said closure having a slit extending from said opening to the outer circumference and being adapted to be twisted sufficiently for application about said assembly.

12. A cable construction of claim 4, in which each closure is disposed within and has a flange directed outwardly of and secured to the cooperating envelope.

13. In an insulated electric cable construction, a pipe-type cable including a metallic cable pipe, the cable being divided into a plurality of cable sections, a pair of metallic coolant pipes in contact with the outside of the cable pipe of each cable section, said coolant pipes being cross connected at the ends of the respective sections, heat insulation surrounding the cable pipe and the coolant pipes, cooling means at the ends of the cable sections connected to the metallic coolant pipes for that section for cooling and circulating a cooling medium through the pair of coolant pipes for that section.

14. An insulated electric cable construction of claim 13, in combination with cooling means connected to the coolant pipes at both ends of each cable section.

15. An insulated electric cable construction of claim 13, in combination with connections and valve means at each end of each cable section for selectively connecting the coolant pipes of two sections in series.

16. An insulated electric cable construction of claim 13, in combination with electric power means energizing each cooling means and a pair of electric power circuits respectively connected to the electric power means for the cooling means at alternate locations between sections.

17. An insulated electric cable construction of claim 13, in which the cable is buried in the earth in combination with a plurality of heat dissipating pipes buried parallel thereto in the earth outside the heat insulation, said heat dissipating pipes being cross connected at the ends of the respective sections, means for circulating a heat dissipating medium in heat transfer relation with a heat evolving part of the cooling means for the coolant pipes and through the heat dissipating pipes.

18. An insulated electric cable construction of claim 13, in which the cable is buried in the earth, in combination with a pair of heat dissipating pipes buried in the earth outside the heat insulation for each cable section, and heat dissipating means located at opposite ends of each cable section for cirulating a heat dissipating medium in heat transfer relation to a heat evolving part of the cooling means and through the heat dissipating pipes.

19. A process of protecting a pipe-type electric cable including a metallic cable pipe against corrosion, the pipe being surrounded at one location by a moisture-impervious insulation contained within a first external tubular envelope, which comprises telescoping a second external tubular envelope with respect to one end of the first external tubular envelope, the second envelope extending in spaced relation to the cable pipe, closing the opposite end of the second external tubular envelope with an end closure secured to the second external tubular envelope, providing an opening into the second external tubular envelope, and distributing into the space around the cable pipe and within the second external tubular envelope a foaming resin to fill the space with a moisture-impervious insulation and protect the cable pipe from corrosion.

20. A process of protecting a pipe-type electric cable including a metallic cable pipe from corrosion, the cable pipe at one point being surrounded by plastic foam and by a first external tubular envelope, which comprises providing a second external tubular envelope comprising a plurality of circumferential segments having flanged lateral ends, bringing the second external tubular envelope into telescoping relation with one end of the first external tubular envelope and securing together the flanged ends of the segments, closing the opposite end of the second external tubular envelope with an end closure secured to the second envelope, providing an opening into the space inside the second external tubular envelope and around the cable pipe, and introducing a foaming resin into this space to substantially fill with moisture-impervious insulation, support the second external tubular envelope, and protect the cable pipe against corrosion.

21. A method of protecting a pipe-type electric cable construction including a metallic cable pipe against corrosion, at the same time dissipating heat from the cable, which comprises extending a plurality of metallic coolant pipes along the outside of the cable pipe and in contact therewith, securing the coolant pipes to the outside of the cable pipe in effective heat transfer relation therewith and selectively section by section surrounding the cable pipe and the coolant pipes in spaced relation with an external tubular envelope telescoping with respect to an external tubular envelope of a previous section at one end, closing the other end of the external tubular envelope of the particular section by an end closure, providing an opening in the first mentioned tubular envelope into the space therein around the cable pipe and the coolant pipes, introducing plastic foam into said opening to substantially fill said tubular envelope and protect against corrosion and circulating a cooling medium through the coolant pipes inside the insulation provided by the plastic foam to remove heat from the cable, and burying the cable including the plastic foam in the earth.

22. A process of claim 21, which comprises burying in the earth alongside the cable and outside of the insulation heat dissipating pipe means, and circulating heat dissipating medium into heat transfer relation with a heat evolving part of the cooling means for the coolant pipes and circulating the heat dissipating medium through the heat dissipating pipe means to dissipate through the earth heat from the cooling means for the coolant pipes.

23. A process of preventing hot spots along a pipe-type electric power cable including a metallic pipe surrounded by thermal insulation and buried in the earth, which comprises extracting heat along a section of said pipe by metallic pipe means within said insulation external to said pipe and in thermal conductive contact with said pipe, circulating a coolant through said pipe means, extracting heat from said coolant at an end of said section and rejecting said heat through heat exchange and refrigerating means to a heat dissipating coolant circulated through second metallic pipe means buried in the earth along said pipe section and disposed externally to said insulation and rejecting heat from said heat dissipating coolant to the environment.

References Cited

UNITED STATES PATENTS

| | | | |
|---|---|---|---|
| 3,233,035 | 2/1966 | Black | 174—22 X |
| 3,007,203 | 11/1961 | Ammons | 18—48 |
| 2,966,341 | 12/1960 | Reder | 174—15 X |
| 2,707,095 | 4/1955 | Parsons et al | 165—45 X |
| 2,424,388 | 7/1947 | Duna | 174—110 X |
| 1,896,841 | 2/1933 | Eby | 174—22 |
| 1,789,229 | 1/1931 | Gebhard. | |

OTHER REFERENCES

Buller: Artificial Cooling of Power Cable, In Transactions of AIEE, vol. 71, Part III, 1952, pp. 634–636.

LEWIS H. MYERS, *Primary Examiner.*

A. T. GRIMLEY, *Assistant Examiner.*